(12) United States Patent
Rusch et al.

(10) Patent No.: US 8,747,101 B2
(45) Date of Patent: Jun. 10, 2014

(54) HIGH VELOCITY OXYGEN FUEL (HVOF) LIQUID FUEL GUN AND BURNER DESIGN

(75) Inventors: William P. Rusch, Westbury, NY (US); Mark Spaulding, Westbury, NY (US); Martin Hacker, Westbury, NY (US)

(73) Assignee: Sulzer Metco (US) Inc., Westbury, NY (US)

( * ) Notice: Subject to any disclaimer, the term of this patent is extended or adjusted under 35 U.S.C. 154(b) by 2124 days.

(21) Appl. No.: 11/314,530

(22) Filed: Dec. 22, 2005

(65) Prior Publication Data
US 2006/0166153 A1    Jul. 27, 2006

Related U.S. Application Data

(60) Provisional application No. 60/646,084, filed on Jan. 21, 2005.

(51) Int. Cl.
*F23D 11/44* (2006.01)

(52) U.S. Cl.
USPC ...... 431/11; 431/4; 431/8; 431/164; 431/166; 431/207

(58) Field of Classification Search
USPC ............. 431/11, 4, 8, 12, 161, 162, 163, 164, 431/166, 207
See application file for complete search history.

(56) References Cited

U.S. PATENT DOCUMENTS

| | | | |
|---|---|---|---|
| 5,019,686 A | | 5/1991 | Marantz |
| 5,328,355 A | | 7/1994 | Kobayashi et al. |
| 5,334,235 A | * | 8/1994 | Dorfman et al. ........... 75/255 |
| 5,503,548 A | * | 4/1996 | Franke et al. ............. 431/10 |
| 5,520,334 A | * | 5/1996 | White ...................... 239/85 |
| 5,834,066 A | | 11/1998 | Kunzli et al. |
| 2002/0092918 A1 | | 7/2002 | Anderson et al. |

FOREIGN PATENT DOCUMENTS

| | | |
|---|---|---|
| EP | 0 361 710 | 4/1990 |
| EP | 1 136 134 | 9/2001 |
| FR | 1 211 882 | 3/1960 |
| JP | 59-142309 | 8/1984 |
| JP | 62-24223 | 2/1987 |
| JP | 2 131160 | 6/1990 |
| JP | 8-200623 | 8/1996 |
| JP | 11-82925 | 3/1999 |
| JP | 11-141811 | 5/1999 |
| JP | 2003-183805 | 7/2003 |
| WO | WO 97/06386 | 2/1997 |
| WO | WO 03/024611 | 3/2003 |

OTHER PUBLICATIONS

European Search Report issued in European counterpart application No. 0640515.6 (8 pages).
English language translation of Office Action dated Nov. 6, 2009 issues in counterpart Japanese Application No. 2006011795 (4 pages).
English language translation of Office Action dated Jun. 3, 2011 issues in counterpart Japanese Application No. 2006-011795 (3 pages).

* cited by examiner

*Primary Examiner* — Alfred Basichas
(74) *Attorney, Agent, or Firm* — Greenblum & Bernstein, P.L.C.

(57) ABSTRACT

The present invention provides a burner design and method for a high velocity oxygen fuel (HVOF) liquid fuel gun that generates turbulent atomization and uses one or more jets as an injection method for liquid fuel and oxygen to improve the combustion inside the combustion chamber. The burner uses preheated oxygen and preheated fuel to improve vaporization prior to combustion of the fuel.

23 Claims, 3 Drawing Sheets

HIGH VELOCITY OXYGEN FUEL (HVOF) LIQUID FUEL GUN AND BURNER DESIGN

CROSS REFERENCE TO RELATED APPLICATIONS

This application claims priority under 35 U.S.C. §119(e) to U.S. Provisional Patent Application No. 60/646,084, "High Velocity Oxygen Fuel (HVOF) Liquid Fuel Gun using an Improved Burner Design," filed Jan. 21, 2005, which is hereby incorporated by reference.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

1. Field of the Invention

This invention relates to an improved method and apparatus for high velocity oxygen fuel (HVOF) thermal spray guns, and more particularly to a burner design to improve the combustion of oxygen and liquid fuel inside a spray gun combustion chamber.

2. Description of Related Art

The high velocity oxygen fuel (HVOF) process is used to produce dense hard coating structures on a variety of substrates and for a variety of applications, such as chrome replacement. HVOF coatings tend to have low residual tensile stress or in some cases have compressive stress, which enable thicker coatings to be applied than is typically possible with the other processes. The high kinetic energy of particles striking a substrate surface allows for the formation of high quality HVOF coatings even when the sprayed particles are not fully molten.

There are a number of HVOF guns which use different methods to achieve high velocity spraying. Use of these guns generally involves the use of either gas or liquid fuels. For liquid fuel guns, generally, a liquid fuel (primarily commercially available kerosene, although #1 diesel, #2 diesel, and similar light oils are also used) and oxygen are injected into a combustion chamber via a burner and the coating material is injected radially into the exit barrel downstream of the combustion chamber and downstream of a convergent/divergent nozzle to velocities in excess of 700 m/sec.

One of the limitations with the HVOF process using existing burner technology is excess carbon in the combustion process due to inefficient combustion. The presence of fuel rich mixture areas causes carbon particles to form that will not completely burn and can buildup on the combustion chamber walls or be ejected from the torch and become lodged in the coating.

Conventional HVOF gun designs have utilized coaxial mixing tubes to achieve liquid fuel atomization and subsequent combustion. Some other HVOF designs utilize the injection of a fuel gas along with the liquid fuel to assist in the atomization and flame anchoring in the combustion chamber. However, there remains a need in the art for a high velocity oxygen fuel spray system with improved efficiency, reduced carbon deposits, and smaller-sized equipment.

SUMMARY OF THE INVENTION

The present invention meets the aforementioned need by providing a burner design for a high velocity liquid fuel gun that generates turbulent atomization and uses one or more jets as an injection method for the liquid fuel and oxygen to improve the combustion inside the combustion chamber. One aspect of the invention is an alteration of the overall gun design to shorten the combustion chamber and overall length of the gun that is permitted by the use of the improved burner design. Certain embodiments may realize greater than a 50% reduction in combustion chamber length over the conventional HVOF gun designs.

According to one aspect, the invention provides a burner for use in a high velocity oxygen fuel thermal spray gun that has at least one injection port that pre-mixes oxygen and liquid fuel and a combustion chamber located downstream of the injection port. The burner uses preheated oxygen and preheated fuel to improve vaporization prior to combustion of the fuel. Multiple injection ports may be used that include means to atomize the liquid fuel into small droplets.

According to another aspect of the invention, a HVOF thermal spray gun is provided with an improved combustion process which, advantageously, improves the operation of the coating process by reducing or eliminating carbon deposits in the coating and by increasing the combustion chamber pressure through increased combustion efficiency (i.e., higher combustion temperatures caused by faster and more complete combustion). The thermal spray gun includes an HVOF burner, wherein the burner uses preheated oxygen and/or preheated liquid fuel to improve vaporization prior to combustion of the fuel. Heat obtained from the combustion of the fuel may be used to preheat the oxygen and/or the fuel.

Another aspect of the invention is directed to a new method to achieve vaporization of the liquid fuel during atomization and prior to combustion by preheating of the oxygen and liquid fuel prior to atomization. The method provides continuous combustion in an HVOF thermal spray gun by preheating oxygen and/or liquid fuel, using the preheated oxygen to atomize the liquid fuel into small droplets, and combusting the atomized fuel. The heat from the step of combusting may be used to preheat the oxygen, which, in turn, may be used to preheat the liquid fuel.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

Figure 1:
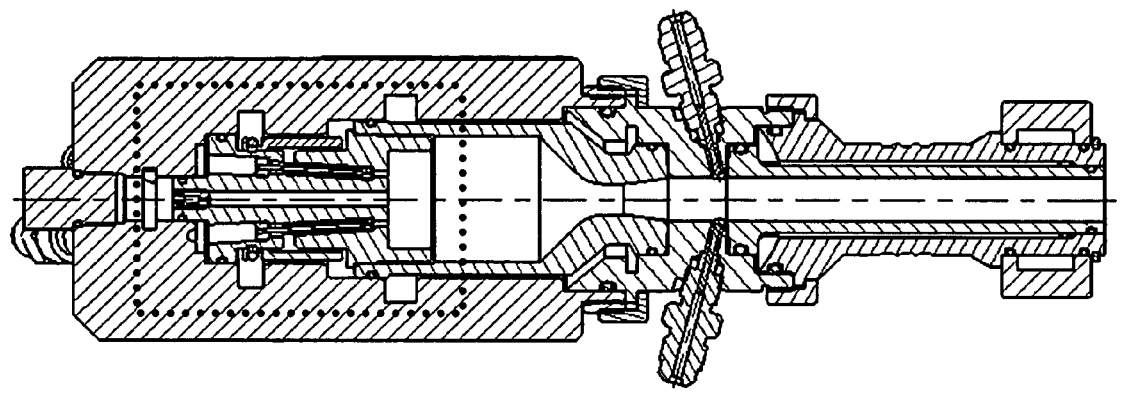
FIG. 1 provides a cross-sectional view of a of a HVOF liquid fuel gun according to one embodiment of the present invention.
Figure 2:
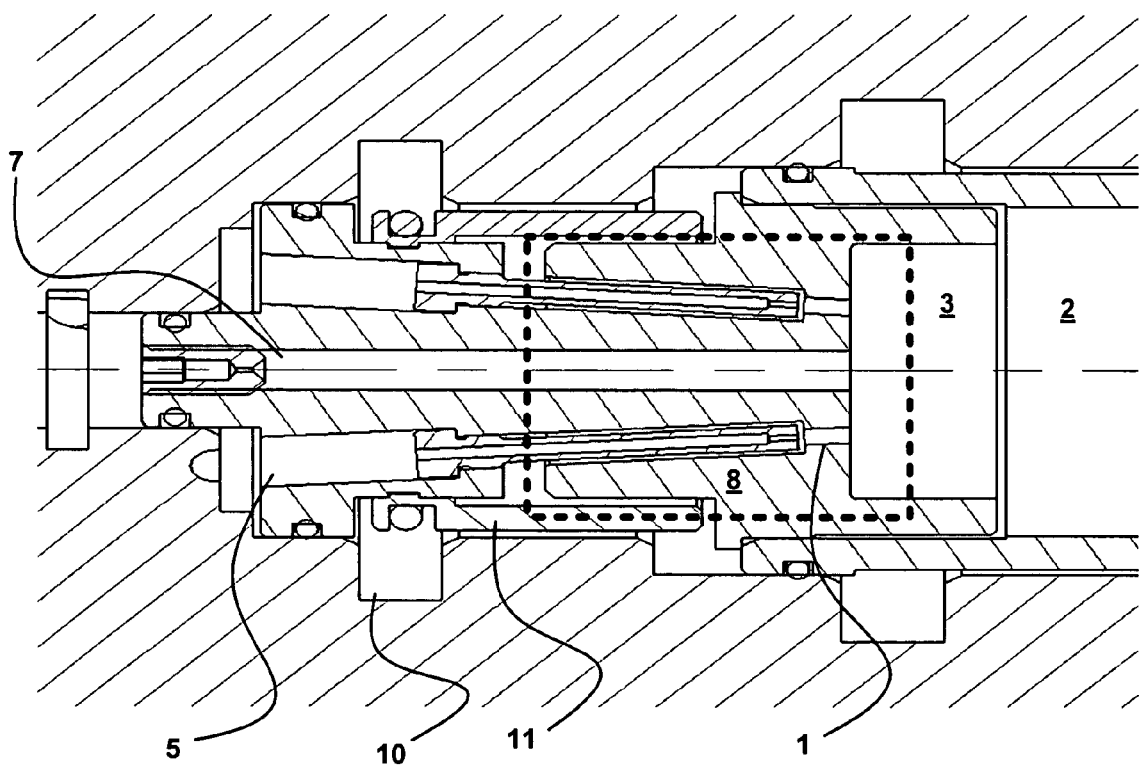
FIG. 2 provides a detailed cross-sectional view of the burner section of the HVOF liquid fuel gun according to one embodiment of the present invention.

FIG. 1 provides a cross-sectional view of a of a high velocity oxygen fuel (HVOF) liquid fuel gun that includes a burner section in accordance with one embodiment of the present invention. FIG. 2 provides a detailed cross-sectional view of one embodiment of the burner section.

The burner design shown in FIG. 2 improves the process of the injection of fuel and oxygen using injection ports 1 that pre-mix the oxygen and fuel to form jets that enter into the combustion chamber 2 which includes a heat transfer chamber 3. Heat transfer chamber 3, may be either a subsection of combustion chamber 2 or a separate adjoining compartment. The number of jets/ports 1 used in the example design is eight, with the ports 1 equally spaced circumferentially around a central axis. This number has been found to provide good results without introducing excessive complexity. However, other numbers of jets can also be used, including a single jet centered along the axis of the gun. Other arrangements, including a plurality of ports with different spacing and/or at different radii from a central axis are also contemplated.

Figure 3:
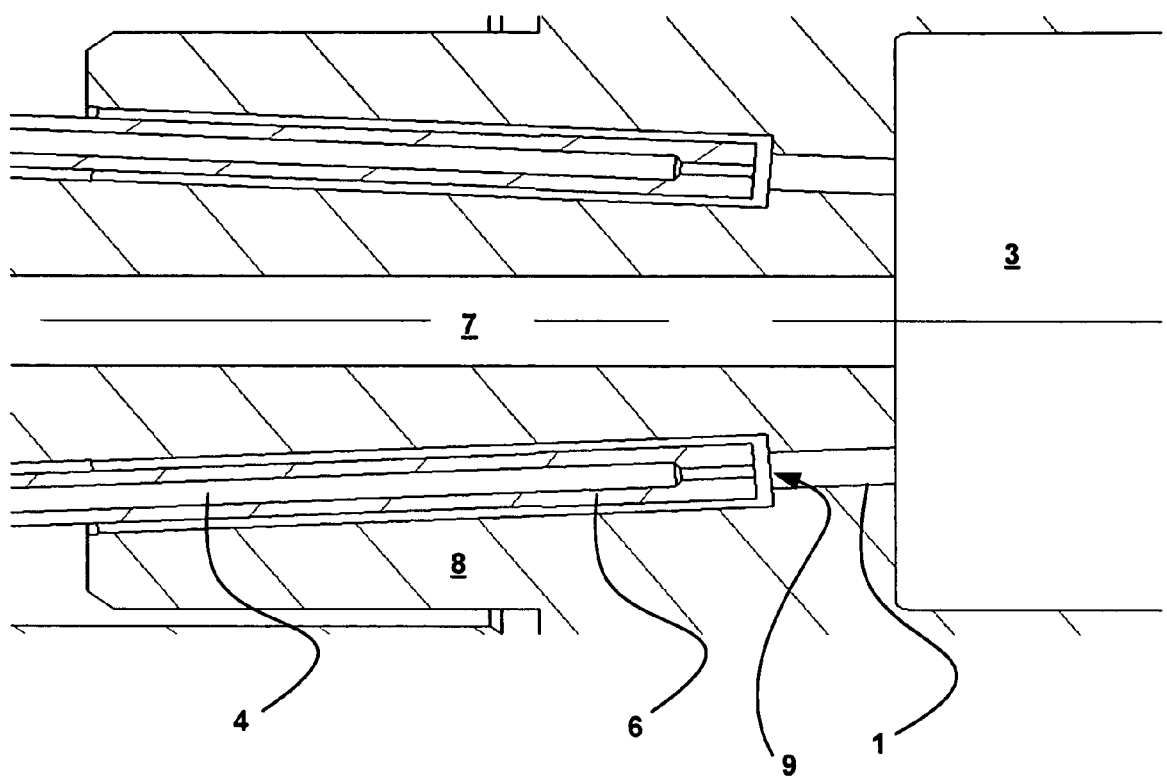
FIG. 3 provides a detained cross-sectional view of the injection ports and surrounding area of the burner section according to one embodiment of the present invention.

FIG. 3 provides a more detailed view of the area around the jet ports 1. With reference to FIGS. 2 and 3, which show a preferred implementation, each port produces a shearing oxygen flow at the opening 9 of port 1 where the fuel and oxygen meet. The oxygen flow radially impinges upon a narrow stream of the liquid fuel 4 that is injected axially down the center of the port 1. Liquid fuel is supplied to the port from the fuel passage 5. The oxygen flow impinges the fuel stream from substantially all directions. The resulting turbulent shearing action of the oxygen against the liquid fuel stream breaks the fuel into very small liquid droplets, increasing the surface area for vaporization.

Each port 1 provides a mixing zone for droplets of liquid fuel to mix and vaporize with the turbulent oxygen flow. The velocity of the gas stream in each mixing port 1 is above the burning velocity for the oxygen fuel mixture, creating a flame. The flame is attached to the exit of the mixing port 1 into the combustion chamber 2/heat transfer chamber 3.

Referring to FIG. 2, prior to entering into the main combustion chamber 2 the flame exiting port 1 may go through a short heat transfer chamber 3 which is used to capture and transfer some of the combustion heat back to the incoming oxygen before entering the port(s) 1. The oxygen enters the burner section at intake 10 and flows past a baffle 111 and past a body 8 that conducts heat from heat transfer chamber 3. The effect is to preheat the incoming oxygen to a temperature close to or above the vaporization temperature of the liquid fuel. Referring to FIG. 3, the preheated oxygen is passed over the liquid fuel delivery tubes 6 prior to the fuel contacting the oxygen to increase the fuel temperature prior to mixing. The contact of the preheated oxygen with the preheated fuel causes the fuel to readily vaporize prior to being injected into the heat transfer chamber 3/combustion chamber 2.

Other methods of preheating the oxygen and/or liquid fuel can also be used. For example, a separate heat source may be provided for the incoming oxygen, while using the oxygen to preheat the fuel as described above. Alternatively, a separate heat source could be provided for both the oxygen and the liquid fuel.

As noted in the background, the presence of fuel rich mixture areas in previous HVOF liquid fuel spray systems causes carbon particles to form that will not completely burn and can buildup on the combustion chamber walls or be ejected from the torch and become lodged in the coating. In the present invention, the substantially homogonous mixture of oxygen and vaporized fuel allows improved combustion since the presence of rich and lean fuel/oxygen areas within the mixture is minimized. The improved combustion advantageously permits the overall length of the combustion chamber to be shortened considerably (e.g., about half or less of the length previously used) as the combustion occurs in a shorter length of chamber. In the embodiment shown in FIGS. 1 and 2 the combustion chamber has been shortened to half of the length used in conventional liquid fuel torches.

A central or axially located port 7 shown in FIGS. 1-3 is for a hydrogen pilot that assists with lighting the gun. Hydrogen is typically used as it is easily ignited in combination of oxygen over a wide stochiometric range and has a high flash speed. A standard spark igniter ignites the hydrogen at the front of the gun, which then burns back inside the combustion chamber to ignite the liquid fuel when introduced. Other techniques can also be used such as, for example, a centrally located spark plug that has an electrode adjacent to or projecting into the combustion chamber.

Figure 4:
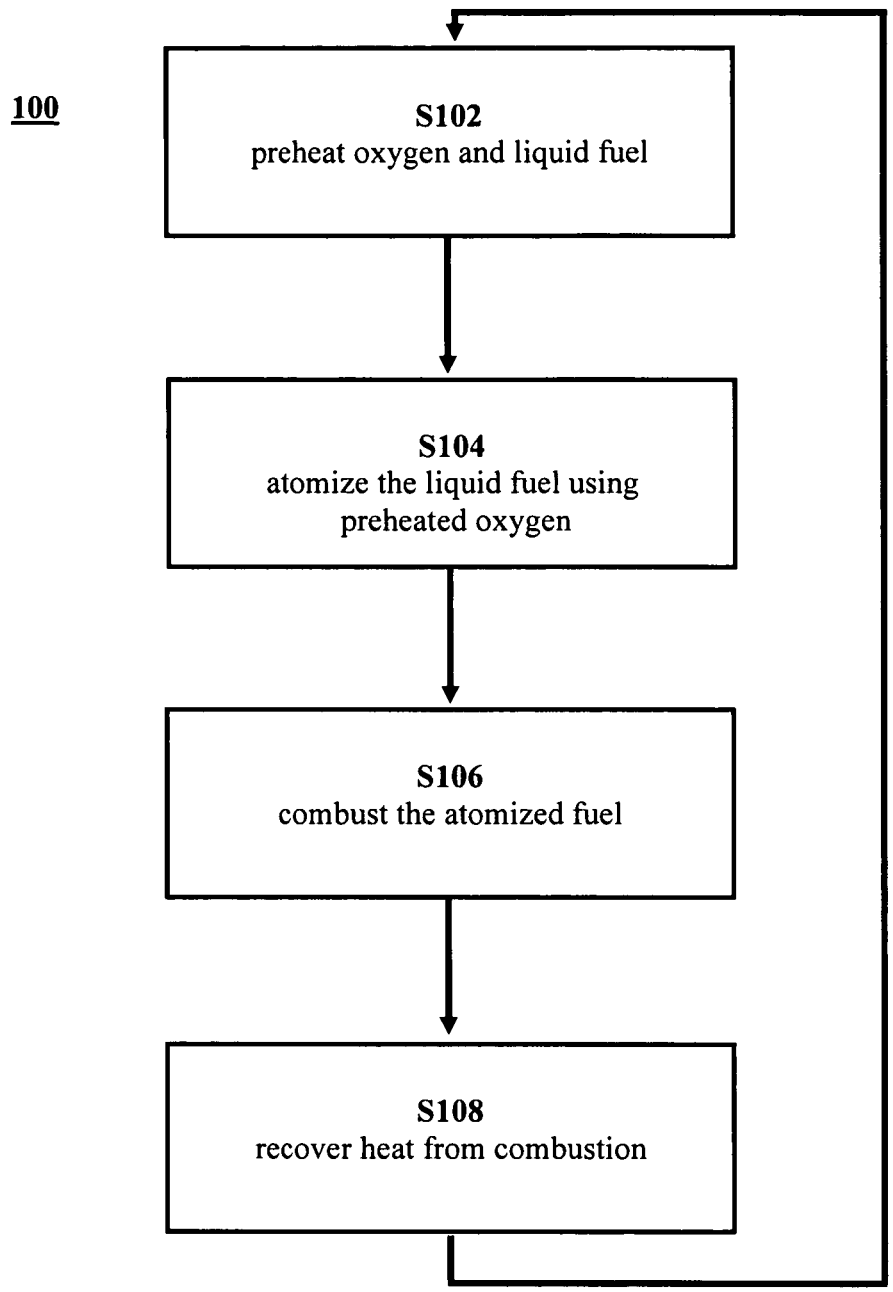
FIG. 4 provides a flow chart for a method of an HVOF combustion process in accordance with the present invention.

FIG. 4 provides a flow chart for a method 100 of an HVOF combustion process in accordance with one embodiment of the present invention. In step S102, the liquid fuel and oxygen are heated prior to the combustion process. Next, in step S104, the liquid fuel is atomized by the turbulent shearing action of the preheated oxygen as the oxygen impinges on the liquid fuel stream and the fuel is vaporized. In step S106, the atomized fuel and oxygen mixture is combusted. During the combustion process, in step S108, the some of the heat from the combustion process is recovered and used to preheat oxygen for the continuation of method 100 at step S102. Alternatively, step S102 can be divided into substeps (not shown), so that the oxygen is preheated in a first substep of step S1102 and then—still prior to combustion—the preheated oxygen is used to preheat the liquid fuel in a separate substep of step S102.

The burner design according to one embodiment of the invention was fabricated as detailed in the previous section and tested against a standard burner design in two liquid fuel guns for comparison. The original gun uses a conventional burner design and a standard length combustion chamber while the improved gun uses the new burner design disclosed herein and a shorter length combustion chamber. For reference, the ratio of the radial oxygen opening into the port versus the diameter of the liquid fuel port was approximately 1. Data was recorded and coating samples were produced with both guns operating under normal conditions using the same controls and parameters.

The difference in flame characteristics were clearly evident, as the original burner design yielded a flame with yellow and orange coloration and the new burner design yielded a flame with significantly more blue coloration. A blue flame is hotter and more efficient than a yellow flame. Yellow indicates the presence of unreacted carbon. The oxygen flow rate was 2000 SCFH and fuel flow rate was 7 gallons per hour for both guns.

Long term testing with both burner designs operating for 60 minutes with the same flow rates given above showed a measurable difference in the amount of carbon deposited in the combustion chamber. The burner design of the present invention had a clean chamber with no deposited carbon as compared to the conventional burner design, which left a thick black layer of carbon deposited on the inside of the combustion chamber walls.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

The invention claimed is:

1. A thermal spray gun comprising: a high velocity oxygen fuel (HVOF) burner that uses oxygen and liquid fuel which are both preheated in the burner before being mixed together to improve vaporization prior to combustion of the liquid fuel.

2. The thermal spray gun of claim 1, wherein the liquid fuel is atomized into small droplets prior to combustion.

3. The thermal spray gun of claim 1, wherein heat obtained from the combustion is used to preheat at least one of the oxygen and the liquid fuel.

4. The thermal spray gun of claim 3, wherein the preheated oxygen is used to preheat the liquid fuel.

5. The thermal spray gun of claim 1, wherein the HVOF burner further comprises one of an atomizer that atomizes the liquid fuel into small droplets and an arrangement providing a shearing oxygen flow at an opening of said injection port.

6. The thermal spray gun of claim 1, wherein the burner further comprises:
   at least one liquid fuel delivery tube arranged to feed the liquid fuel to at least one injection port and being arranged in a body that conducts heat from the combustion to a space located adjacent the at least one liquid fuel delivery tube,
   wherein oxygen is supplied to and preheated in the space, the liquid fuel is pre-heated in the at least one liquid fuel delivery tube before flowing out of the opening of the at least one injection port, and the thermal spray gun is configured to apply a coating on a substrate.

7. The thermal spray gun of claim 1, further comprising a device arranged within the thermal spray gun that is structured and arranged to preheat the oxygen and the liquid fuel as they flow within the burner and prior to the mixing of the oxygen and the liquid fuel inside the burner.

8. A high velocity oxygen fuel (HVOF) thermal spray gun burner comprising:
   at least one injection port that pre-mixes oxygen and liquid fuel; and
   said injection port being located upstream of a combustion chamber of the HVOF thermal spray gun,
   wherein the burner uses oxygen and liquid fuel which are both preheated in the burner before being mixed together to improve vaporization prior to combustion of the liquid fuel.

9. The burner of claim 8, wherein the liquid fuel is atomized into small droplets prior to combustion.

10. The burner of claim 8, wherein said at least one injection port comprises a plurality of injection ports arranged circumferentially around a central axis.

11. The burner of claim 8, further comprising a heat transfer chamber located between said injection port and said combustion chamber.

12. The burner of claim 8, wherein heat obtained from the combustion of the liquid fuel is used to preheat at least one of the oxygen and the liquid fuel.

13. The burner of claim 8, wherein an external heating source is used to preheat at least one of the oxygen and the liquid fuel.

14. The burner of claim 8, further comprising one of an atomizer that atomizes the liquid fuel into small droplets and an arrangement providing a shearing oxygen flow at an opening of said injection port.

15. The burner of claim 8, further comprising a device arranged within the burner that is structured and arranged to preheat the oxygen and the liquid fuel as they flow within the burner and prior to the mixing of the oxygen and the liquid fuel inside the burner.

16. The burner of claim 8, further comprising a body structured and arranged to preheat the oxygen and the liquid fuel as they flow within the burner, wherein the body conducts heat from combustion to a location inside the burner.

17. A method of providing continuous combustion in a high velocity oxygen fuel (HVOF) thermal spray gun comprising the steps of:
   preheating oxygen and liquid fuel within a burner of the HVOF thermal spray gun;
   after the preheating, mixing together the oxygen and the liquid fuel in the burner;
   atomizing the liquid fuel into small droplets; and
   combusting the atomized fuel.

18. The method of claim 17, wherein heat from the step of combusting is used to preheat at least one of the oxygen and the liquid fuel.

19. The method of claim 18, wherein the preheated oxygen is used to preheat the liquid fuel.

20. The method of claim 17, wherein said atomizing step is accomplished using the preheated oxygen.

21. The method of claim 17, further comprising:
   feeding liquid fuel to at least one injection port via at least one liquid fuel delivery tube arranged in a body;
   conducting heat from the combusting to a space surrounding the at least one liquid fuel delivery tube;
   feeding the oxygen through the space surrounding the at least one liquid fuel delivery tube;
   atomizing the liquid fuel into small droplets via a shearing oxygen flow at an opening of the at least one injection port; and
   applying a coating on a substrate via the HVOF thermal spray gun.

22. The method of claim 21, wherein the liquid fuel is pre-heated via the pre-heated oxygen in the at least one liquid fuel delivery tube.

23. The burner of claim 8, further comprising:
   at least one liquid fuel delivery tube arranged to feed the liquid fuel to said injection port; and
   a body that conducts heat from the combustion to a space surrounding the at least one liquid fuel delivery tube,
   wherein oxygen is pre-heated in the space, the preheated oxygen experiences a shearing oxygen flow at an opening of said injection port, the liquid fuel is pre-heated in the at least one liquid fuel delivery tube before flowing out of the opening of said injection port, and the HVOF thermal spray gun is configured to apply a coating on a substrate.

* * * * *